US009622412B2

(12) United States Patent
Hasenour et al.

(10) Patent No.: US 9,622,412 B2
(45) Date of Patent: Apr. 18, 2017

(54) DRAPER HEADER WITH BELT CLEANING ARRANGEMENT

(71) Applicant: Deere & Company, Moline, IL (US)

(72) Inventors: Anthony M Hasenour, East Moline, IL (US); Corwin M Puryk, Bettendorf, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/155,396

(22) Filed: Jan. 15, 2014

(65) Prior Publication Data
US 2015/0195993 A1    Jul. 16, 2015

(51) Int. Cl.
*A01D 57/20* (2006.01)
*A01D 61/00* (2006.01)

(52) U.S. Cl.
CPC .......... *A01D 57/20* (2013.01); *A01D 61/002* (2013.01)

(58) Field of Classification Search
CPC ........ A01D 41/14; A01D 57/06; A01D 57/20; A01D 61/02; A01D 61/002; B65G 15/42; B65G 15/44; B65G 21/2081; B65G 21/2072; B65G 21/2045; B65G 21/20
See application file for complete search history.

(56) References Cited

U.S. PATENT DOCUMENTS

| | | | | |
|---|---|---|---|---|
| 2,272,103 A * | 2/1942 | Williams | ............... | A01D 61/02 198/690.2 |
| 4,708,238 A | 11/1987 | Bultman et al. | | |
| 5,456,067 A | 10/1995 | Marler | | |
| 5,459,986 A * | 10/1995 | Talbot | ............... | A01D 61/002 56/14.5 |
| 7,472,533 B2 * | 1/2009 | Talbot | ............... | A01D 57/20 56/181 |
| 7,543,428 B1 * | 6/2009 | Puryk | ............... | A01D 57/20 430/127 |
| 7,908,836 B1 * | 3/2011 | Rayfield | ............... | A01D 57/20 56/181 |
| 7,958,711 B1 * | 6/2011 | Sauerwein | ............... | A01D 57/20 56/181 |
| 8,291,686 B1 * | 10/2012 | Cormier | ............... | A01D 61/002 56/181 |
| 8,322,520 B2 * | 12/2012 | Dow | ............... | A01D 61/002 198/837 |
| 8,484,939 B1 * | 7/2013 | Cormier | ............... | A01D 43/06 56/158 |

(Continued)

FOREIGN PATENT DOCUMENTS

EP    2502484 A1    9/2012

OTHER PUBLICATIONS

European Search Report issued in counterpart application No. 14193026.3, dated Jun. 30, 2015 (7 pages).

*Primary Examiner* — Alicia Torres
*Assistant Examiner* — Adam Behrens

(57) ABSTRACT

An endless belt for a side conveyor (104, 106) of a draper header (100) has a web width an upper, crop conveying surface that is generally planar over substantially its entire extent. The web comprises a forward edge portion that is configured to be covered by a crop ramp. A plurality of protrusions (300, 400, 500, 502, 504, 602, 606) is fixed to and extends upward from the forward edge portion. The side conveyor (104, 106) comprises the endless belt and the crop ramp.

19 Claims, 4 Drawing Sheets

(56) References Cited

U.S. PATENT DOCUMENTS

| | | | |
|---|---|---|---|
| 2008/0092508 A1* | 4/2008 | Talbot | A01D 61/002 56/181 |
| 2008/0202090 A1* | 8/2008 | Lovett | A01D 61/002 56/208 |
| 2008/0276590 A1* | 11/2008 | Sauerwein | A01D 41/14 56/153 |
| 2009/0007533 A1* | 1/2009 | Lovett | A01D 61/002 56/14.5 |
| 2011/0308221 A1* | 12/2011 | Sauerwein | A01D 41/14 56/181 |
| 2012/0043185 A1* | 2/2012 | Dow | A01D 61/002 198/837 |
| 2012/0216500 A1* | 8/2012 | Sauerwein | A01D 41/14 56/181 |
| 2014/0059995 A1* | 3/2014 | Cormier | A01D 43/06 56/181 |
| 2014/0165526 A1* | 6/2014 | Leys | A01D 41/14 56/181 |
| 2015/0007544 A1* | 1/2015 | Herringshaw | A01D 34/40 56/181 |

* cited by examiner

DRAPER HEADER WITH BELT CLEANING ARRANGEMENT

FIELD OF THE INVENTION

The invention pertains to draper headers. More particularly, it relates to draper belts having self-cleaning features.

BACKGROUND

Agricultural harvesters use a variety of implements attached to their front ends to gather crops. One type of these implements is called a "draper" or a "draper header". Draper headers use endless belt conveyors to carry cut crop material from a reciprocating knife to a center region of the header, and then to convey the cut crop material rearward into the agricultural harvester itself. Once in the agricultural harvester, the cut crop material is further processed by separating grain from unwanted crop material (typically called "material other than grain" or "MOG").

In recent years, agricultural engineers have increased the length of draper headers. In order to do so, they have made several innovations. One of these is supporting the draper header on floating arms that permit the reciprocating knife to float up and down and better follow the contours of the land. In order to do this, they have further provided segmented crop ramps that extend rearward from the reciprocating knife over the leading edge of the endless belt conveyors. These crop ramps ensure that the cut crop material is lifted upward over the leading edges of the endless belt conveyors.

One problem that has arisen with this arrangement is crop becoming wedged between the segments of the crop ramps and the upper surface of the endless belts. In co-pending application U.S. Ser. No. 13/933,758 (filed 2 Jul. 13, entitled "Self-Cleaning Crop Ramp"), a partial solution to this problem was proposed. The Ser. No. 13/933,758 application is Incorporated herein by reference for all that it teaches. In this application it was proposed to provide the bottom surface of the crop ramp segments with recesses that will tend to capture cut crop material and propel it rearward and out from between the lower surface of the crop ramp segment and the upper surface of the endless belt.

While this has improved the performance of draper headers with segmented crop ramps, it has not eliminated the problem. What is needed, therefore, is an alternative draper header and endless belt that will further improve the expulsion of grain from between the crop ramp segments and the endless belts of the draper header. It is an object of this invention to provide such an improvement.

SUMMARY OF THE INVENTION

In accordance with a first aspect of the invention, an endless belt for a side conveyor of a draper header is provided, the endless belt having a direction of travel, and the endless belt comprising: a web having a width in a direction transverse to a direction of travel of the web, and having an upper, crop conveying surface that is generally planar over substantially its entire extent, the web comprising a forward edge portion that is configured to be covered by a crop ramp; and a plurality of protrusions fixed to and extending upward from the forward edge portion.

Each of the plurality of the protrusions may include at least one forward facing surface that extends generally perpendicular to the direction of travel of the web with respect to the draper header.

Each of the plurality of protrusions may include at least one forward facing surface that is disposed at an angle to sweep cut crop material toward a trailing edge of the crop ramp.

Each of the plurality of protrusions may include at least one forward facing surface that is disposed at an angle to sweep cut crop material toward a leading edge of the web.

The web may further comprise a plurality of cleats that are fixed to and extend upward from the web and in a direction perpendicular to the direction of travel of the endless belt, and further wherein each of the plurality of protrusions is disposed immediately adjacent to a corresponding cleat.

Each of the plurality of protrusions may abut a corresponding cleat.

In accordance with a second aspect of the invention, a side conveyor of a draper header comprises: an endless belt, the endless belt having a direction of travel, the endless belt further comprising: a web comprising a crop carrying portion having an exposed upper surface and further comprising a forward edge portion, wherein the forward edge portion further comprises a plurality of protrusions fixed to and extending upward from the forward edge portion; a crop ramp comprising a plurality of crop ramp segments, wherein each of the plurality of crop ramp segments comprises a rear portion, wherein the rear portion has a trailing edge, wherein the rear portion is disposed to cover the forward edge portion, wherein the rear portion defines at least one elongate recess on an undersurface of the rear portion and wherein the at least one elongate recess is disposed at an angle to convey crop particles trapped between the forward edge portion of the web and the undersurface toward a trailing edge of each of the plurality of crop ramp segments.

The plurality of protrusions may be disposed to engage the at least one elongate recess and sweep the crop particles along the at least one elongate recess and toward the trailing edge.

Each of the plurality of protrusions may have a forward facing surface that is disposed to engage the at least one elongate recess over substantially an entire length of the at least one elongate recess.

Each of the plurality of the protrusions may include at least one forward facing surface extending generally perpendicular to the direction of travel of the web with respect to the draper header.

Each of the plurality of protrusions may include at least one forward facing surface that is disposed at an angle to sweep cut crop material toward a trailing edge of the crop ramp.

Each of the plurality of protrusions may include at least one forward facing surface that is disposed at an angle to sweep cut crop material toward a leading edge of the web.

The web may further comprise a plurality of cleats that are fixed to and extend upward from the web and in a direction perpendicular to the direction of travel of the endless belt, and each of the plurality of protrusions may be disposed immediately adjacent to a corresponding cleat.

Each of the plurality of protrusions may abut a corresponding cleat.

DETAILED DESCRIPTION

The term "forward facing" when referring to features on an endless belt means facing in a direction of travel of the belt ("B" herein) with respect to the frame of the draper header. The terms "rear facing" or "rearward facing" when referring to features on an endless belt means facing away from the direction of travel of the belt with respect to the frame of the draper header 100.

Figure 1:
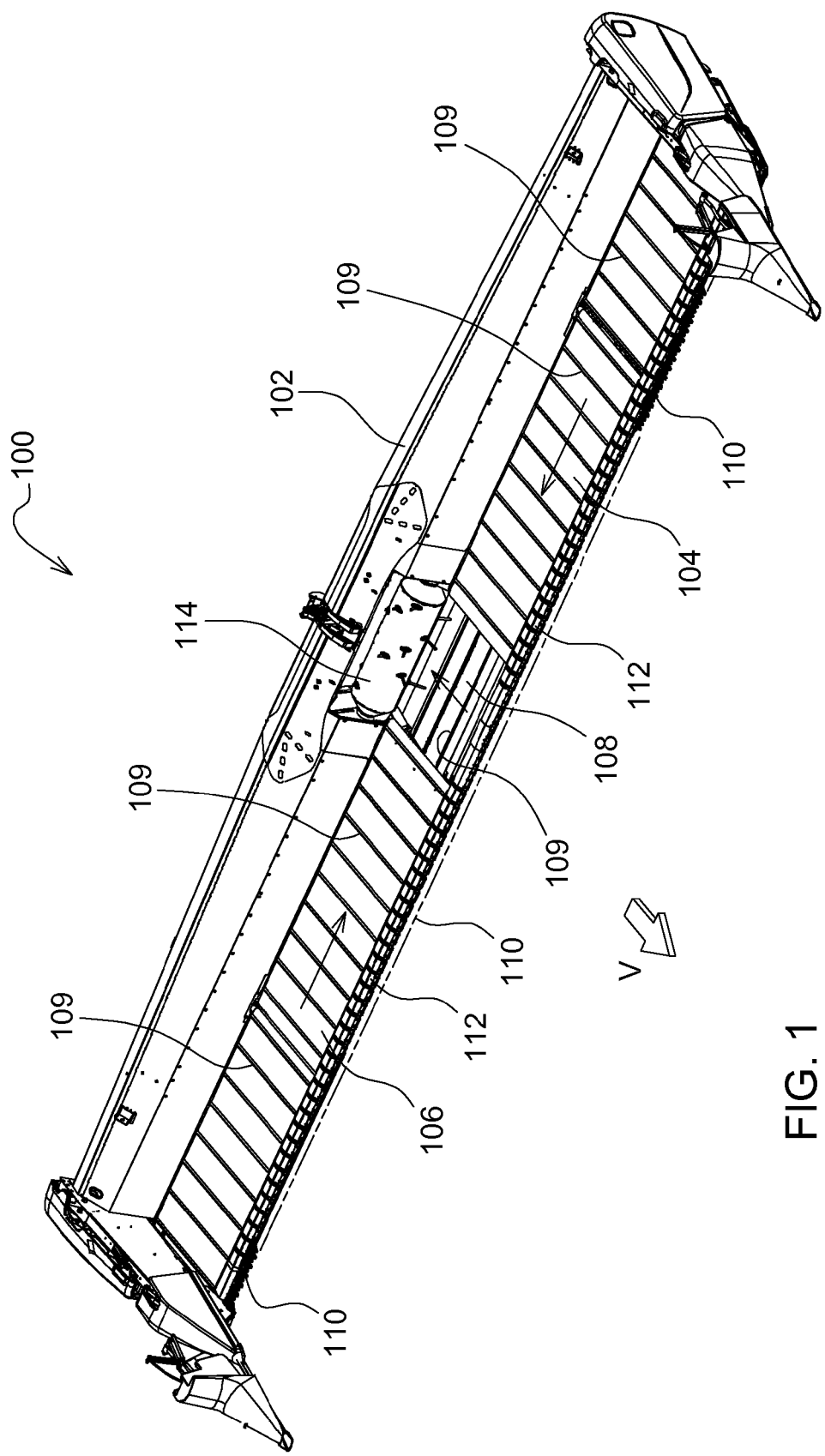
FIG. 1 is a perspective view of a draper header in accordance with present invention.

In FIG. 1, a draper header 100 is shown that comprises a frame 102. The frame 102 supports a left side conveyor 104, right side conveyor 106, and a center conveyor 108. These conveyors are of the endless belt type, and comprise an endless elastomer-impregnated fabric belt that is supported on two or more rollers.

Cleats 109 are fixed to the surface of each of the endless belts of the conveyors 104, 106, 108 and extend in a direction transverse to the direction of travel. These cleats 109 extend substantially the entire crop carrying width of the endless belts, but do not extend to the leading edge or the trailing edge of the endless belts.

In FIG. 1, the three conveyors 104, 106, 108 convey cut crop material in the direction indicated by the arrow superimposed on top of the endless belts of these conveyors. The draper header 100 further comprises a reciprocating knife 110 that extends across substantially the entire width of the draper header 100. The draper header 100 further comprises an elongate row of crop ramp segments 112 that interlock with adjacent crop ramp segments 112, that extend across substantially the entire width of the draper header 100, and that are disposed just behind the reciprocating knife 110. The draper header 100 further comprises a cylindrical conveyor 114 that engages the upper surface of the mat of cut crop material on the center conveyor 108 and carries it rearward through an aperture in the frame 102 and into the agricultural harvester (not shown).

In operation, the agricultural harvester, which supports the draper header 100, carries the draper header 100 through an agricultural field in a direction "V" to harvest crops. The reciprocating knife 110 severs the crops adjacent to the ground, and the cut crop material falls rearward onto the three conveyors. The left side conveyor 104 carries the crop rightward toward the center of the draper header 100. The right side conveyor 106 carries the crop leftward toward the center of the draper header 100, and the center conveyor 108 carries the crop rearward toward and underneath the cylindrical conveyor 114. All this cut crop material is conveyed rearward through the aperture in the frame 102 of the draper header 100 and thence into the agricultural harvester.

Figure 2:
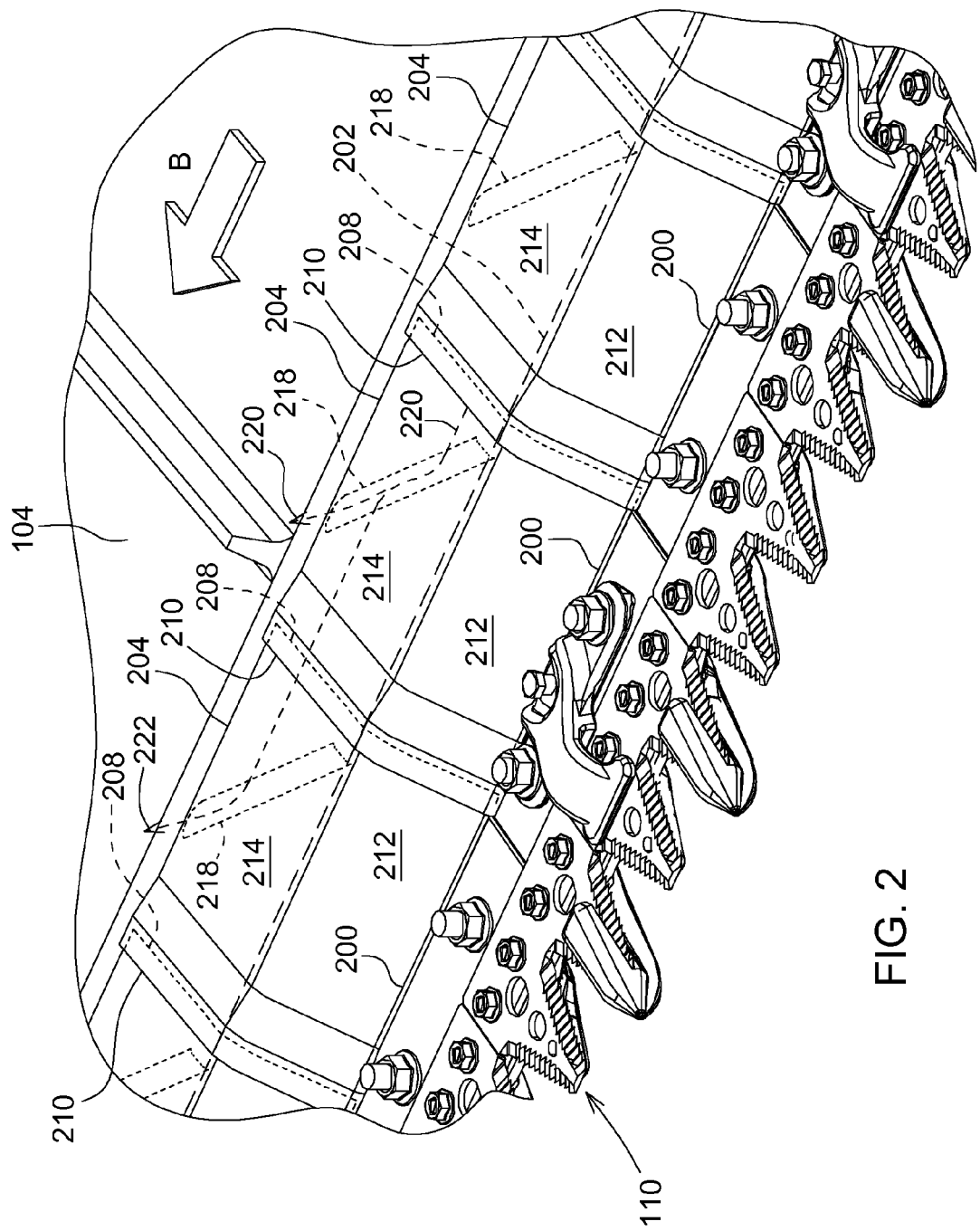
FIG. 2 is a fragmentary detail view of the draper header of FIG. 1.

FIG. 2 is a detailed fragmentary view of the left side conveyor 104. The description below regarding the left side conveyor 104 is true of the right side conveyor 106. The right side conveyor 106 is constructed identical to the left side conveyor 104 but in mirror image form mirrored about a vertical and fore-and-aft extending axis that extends through the lateral midpoint of the draper header 100.

FIG. 2 shows several crop ramp segments 112 that are disposed adjacent to each other. These crop ramp segments 112 have a leading edge 200. The crop ramp segments 112 extend rearward and over the leading edge 202 of the endless belt thereby covering a leading edge portion of the web. The crop ramp segments 112 have a trailing edge 204 that is disposed behind the leading edge 202 such that they cover a forward portion of the endless belt of left side conveyor 104. Each crop ramp segment 112 is engaged with its adjacent crop ramp segments 112. Each crop ramp segment 112 is identical to its two adjacent crop ramp segments 112. Each crop ramp segment 112 has a tongue 208 that extends from the left side of the crop ramp segment 112 and a groove 210 that extends from the right side of the crop ramp segment 112. When the crop ramp segments 112 are arranged in a line (as shown in FIGS. 1-2), the tongue 208 of each crop ramp segment 112 is disposed in the groove 210 of and adjacent crop ramp segment 112. The tongue and groove joints formed by this interengagement permit adjacent crop ramp segments 112 to move laterally with respect to each other as the reciprocating knife 110 of the draper header 100 flexes up and down.

Each crop ramp segment 112 includes a forward planar portion 212 that extends from the reciprocating knife 110 to the leading edge 202 of the endless belt of the left side conveyor 104. This portion lifts the cut crop material from the reciprocating knife 110 upward and slightly above the level of the endless belt. Each crop ramp segment 112 includes a rear planar portion 214 that is fixed to the forward planar portion 212 and extends rearward over the top of the leading edge of the endless belt.

Elongate recesses 218 are formed on the underside of the rear planar portion 214. These recesses extend in the direction of belt travel (indicated by the arrow "B") and also rearward. These elongate recesses 218 are provided to assist in removing cut crop material from between the bottom surface of the rear planar portion 214 in the upper surface of the endless belt.

Due to the flexible construction of the crop ramp segments 112 and the endless belt, the endless belt flexes up and down and out of contact with the crop ramp segments 112. This typically happens when the draper header 100 is traveling through the field and the reciprocating knife 110 flexes up and down following the contours of the soil. When this happens, cut crop material falls into the space between the endless belt and the crop ramp segment 112. Since the endless belt is continuously moving, backspace with respect to the crop ramp segments 112, it carries this cut crop material downward and into the elongate recesses 218. Once in the elongate recesses 218, at least some of the cut crop material is carried inward (towards the center of the draper header 100) and rearward (toward the endless belt) following a path schematically indicated as item 220.

Some of the crop material, however, will not be removed. It will enter an elongate recess 218, then fall out of the elongate recess 218 and be carried downstream to another (perhaps the next) elongate recess 218, which will carry it rearward and out from between the crop ramp segments 112 and the endless belt following a path 220.

Some of the crop material will be carried even further downstream into other elongate recesses 118 to then be carried rearward and out from between the crop ramp segments 112 and the endless belt following a path such as path 222. To enhance this process of clearing cut crop material from between the crop ramp segments 112 and the endless belt, it is beneficial to have (either alone, or in combination with the elongate recesses 218) another means of urging cut crop material rearward and out of the between the crop ramp segments 112 and the endless belt.

For this reason, the leading edge of the endless belt is provided with crop engaging structures that are disposed underneath the rear planar portion 214 that work alone, or in conjunction with, the elongate recesses 218.

Figure 3:
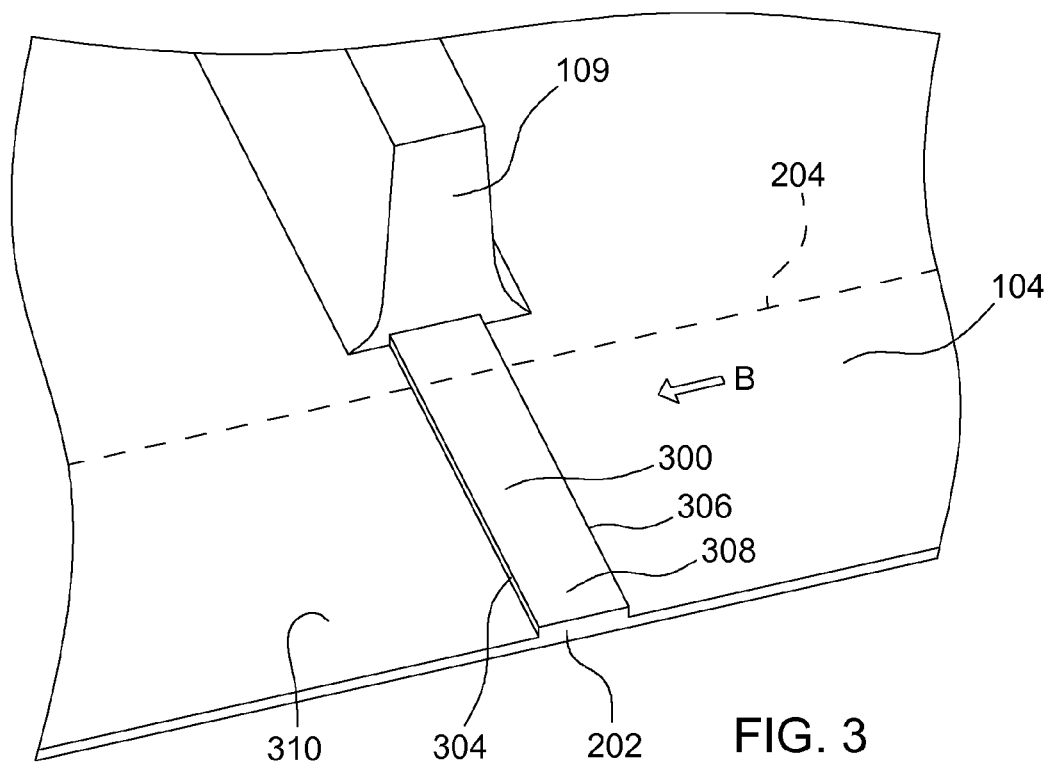
FIG. 3 is a fragmentary perspective view of a first embodiment of a draper belt of the draper header of FIGS. 1-2.

In FIG. 3, a belt cleaning feature for the endless belt of the left side conveyor 104 is shown. An elongate protrusion 300 is provided on the endless belt that extends vertically upward from the top surface of the web of the endless belt, generally perpendicular to the web of the endless belt. The elongate protrusion 300 extends from a cleat 109 to the leading edge 202 of the endless belt. The elongate protrusion 300 extends rearward from the leading edge 202 of the endless belt past the trailing edge 204 of the crop ramp segments 112. The elongate protrusion 300 extends in a direction generally perpendicular to the direction of travel "B" of the endless belt. The elongate protrusion 300 has a constantly substantial thickness in a direction perpendicular to the web of the endless belt.

Substantially the entire underside and the entire lower facing surface of the rear planar portion 214 of each crop ramp segment 112 abut the elongate protrusion 300. Further, the elongate protrusion 300 extends over substantially the entire length of the elongate recess 218 provided on the bottom surface of each crop ramp segment 112.

The elongate protrusion 300 has a forward facing surface 304 (i.e. forward in the sense of facing in the direction of travel "B") that is generally vertical, and that tends to engage cut crop material embedded between the upper surface of the endless belt and each crop ramp segment 112 and carry that material along in the direction of belt travel "B" to the next elongate recess 218, where the material is deposited. The elongate protrusion 300 has a rear facing surface 306 that is generally vertical, and that is parallel to the forward facing surface 304 and that faces rearward (i.e. faces away from the direction of travel "B"). The elongate protrusion 300 has a top surface 308 that is generally planar and parallel to the top surface 310 of the web of the endless belt. The elongate protrusion 300 has a constant width in the direction of travel "B".

As the forward facing surface 304 travels in the direction of travel "B", it sweeps down the length of the elongate recess 218 starting from the forward most portion of the elongate recess 218 (i.e. the portion adjacent to the leading edge 202 of the endless belt). This tends to gather the cut crop material that is trapped, and move it rearwardly (with respect to the direction of travel of the draper header 100 through the field) down the length of the elongate recess 218 until it exits the elongate recess 218 and is released at the trailing edge 204 of the crop ramp segment 112.

Figure 4:
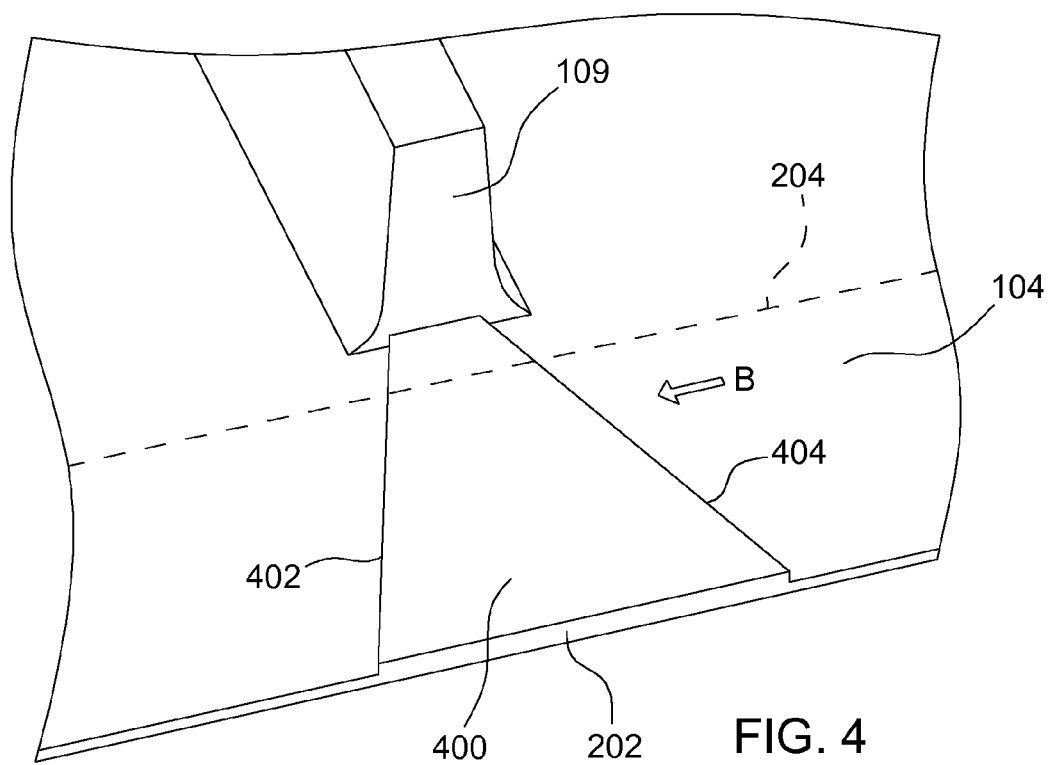
FIG. 4 is a fragmentary perspective view of a second embodiment of a draper belt of the draper header of FIGS. 1-2.

In FIG. 4, an alternative belt cleaning feature for the endless belt of the left side conveyor 104 is shown. An elongate protrusion 400 is configured the same as the elongate protrusion 300 of FIG. 3, except the forward facing surface 402 is angled away from the direction of travel "B", thus orienting the forward facing surface 402 at a steeper angle with respect to the elongate recesses 218. This steeper angle improves the ability of the elongate protrusion 400 to better engage and convey cut crop material that is trapped between the crop ramp segments 112 and the endless belt. It improves the ability of the elongate recesses 218 to clear the cut crop material that is trapped. Further, the forward facing surface 402 acts as a blade to plow the cut crop material that is trapped both rearward and toward the trailing edge 204 even in the absence of any elongate recesses 218. The elongate protrusion 400 also has a rear facing surface 404 that faces to the rear (i.e. faces away from the direction of travel "B"), that is generally vertical, and that is generally perpendicular to the surface of the web of the endless belt. The rear facing surface 404 extends from the leading edge 202 of the endless belt simultaneously toward the rear of the draper header 100 and also in the direction of travel "B" of the endless belt. The elongate protrusion 400 is narrower the farther the elongate protrusion 400 is from the leading edge 202 of the endless belt. This provides more vigorous cleaning action for the trapped cut crop material along the leading edge 202 of the endless belt. The elongate protrusion 400 extends from the leading edge 202 to the trailing edge 204 and further to the cleat 109.

Figure 5:
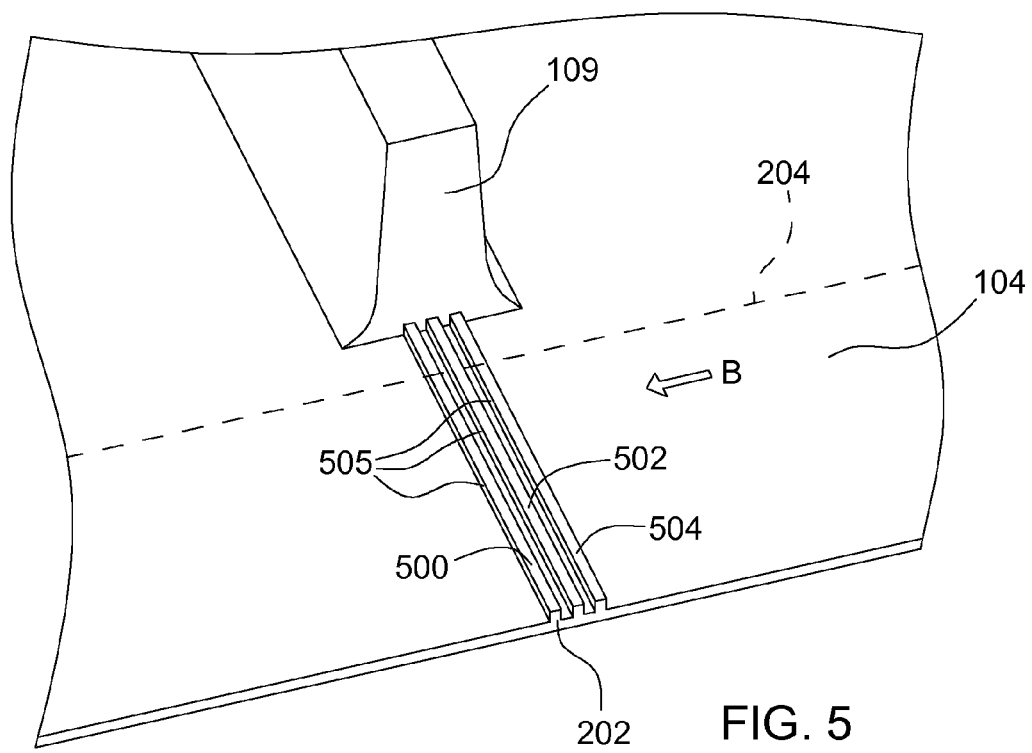
FIG. 5 is a fragmentary perspective view of a third embodiment of a draper belt of the draper header of FIGS. 1-2.

In FIG. 5, an alternative belt cleaning feature for the endless belt of the left side conveyor 104 is shown. In this arrangement, three elongate protrusions 500, 502, 504 are provided. These three protrusions provide three forward facing surfaces 505 that are generally vertical and oriented generally perpendicular to the direction of travel "B". They are spaced closely together such that the distance (in the direction of travel "B") between adjacent protrusions is less than one-half the overall length of the protrusions 500, 502, 504. The distance may also be less than one-quarter the overall length of the protrusions 500, 502, 504. The distance may also be less than one-tenth of the overall length of the protrusions 500, 502, 504. Due to this close spacing of the protrusions, a plurality of protrusions can pass over and scour an elongate recess 218 simultaneously. This provides a better cleaning of the elongate recess 218 and therefore better conveyance of the cut crop material in the recesses rearward toward the trailing edge 204 of the crop ramp segment 112 in which the elongate recess 218 is formed. Rather than sweeping an elongate recess 218 by a single forward facing surface at a time and leaving some cut crop material trapped in the elongate recess 218, two or more forward facing surfaces can simultaneously sweep each elongate recess 218 at the same time. The three elongate protrusions 500, 502, 504 extend from the leading edge 202 to the trailing edge 204 and further to the cleat 109.

Figure 6:
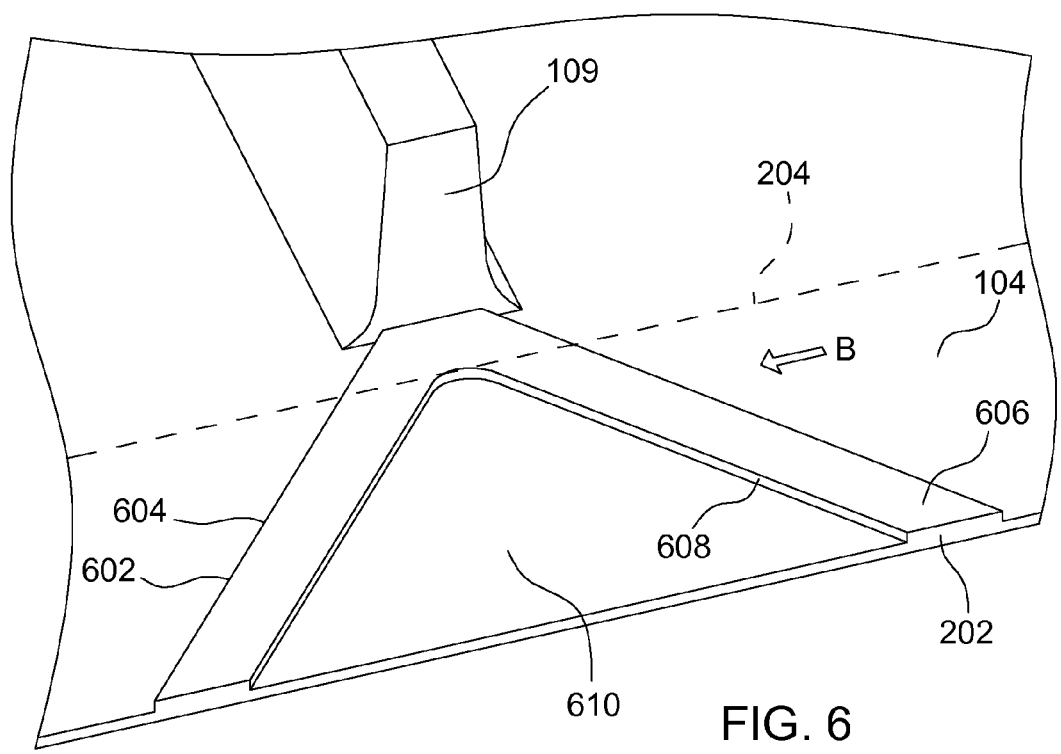
FIG. 6 is a fragmentary perspective view of a fourth embodiment of a draper belt of the draper header of FIGS. 1-2.

In FIG. 6, an alternative belt cleaning feature for the endless belt of the left side conveyor 104 is shown. A first protrusion 602 extends upward from the web of the endless belt. The first protrusion 602 has a forward facing surface 604 that serves (as in all the previous arrangements) to sweep cut crop material rearward and down the elongate recesses 218. It is disposed at an angle to provide better cleaning of the elongate recess 218. The first protrusion 602 extends from the leading edge 202 of the endless belt to the trailing edge 204 of the crop ramp segments 112 and further to the cleat 109.

A second protrusion 606 extends upward from the web of the endless belt. The second protrusion 606 has a forward facing surface 608 that serves to sweep any remaining cut crop material forward until it exits a space between the leading edge 202 of the endless belt of the left side conveyor 104 and the crop ramp segments 112.

Most of the cut crop material that is trapped will be swept toward the rear of the draper header 100 and out past the trailing edge 204 of the crop ramp segments 112 by the forward facing surface 604. The particles that remain will fall into the recessed region 610 between the first protrusion 602 and the second protrusion 606. The small particles that remain will be swept to the front of the draper header 100 by the leading edge 608.

The arrangements illustrated and described herein are merely examples of one way to create the invention. Someone skilled in the art of this invention would readily see other ways to create the invention that would fall within the scope of the claims. It is the claims that define the scope of the invention.

We claim:

1. A side conveyor for a draper header, the side conveyor comprising:
   an endless belt with a web having a width in a direction transverse to a direction of travel of the web, and having an upper, crop conveying surface that is generally planar over substantially its entire extent, the web comprising a forward edge portion; and
   a crop ramp comprising a plurality of crop ramp segments, wherein each of the plurality of crop ramp segments comprises a rear portion, wherein the rear portion has a trailing edge, wherein the rear portion covers the forward edge portion, wherein at least one elongate recess is formed on an underside of the rear portion and wherein the at least one elongate recess is disposed at an angle, the at least one elongate recess having an internal side face oblique to the direction of travel of the web;
   wherein the web comprises a plurality of protrusions fixed to and extending upward from the forward edge portion;
wherein the longitudinal axis of the at least one elongate recess extends in the direction of travel of the web and also rearward to convey crop particles trapped between the forward edge portion of the web and the underside of the crop ramp toward a trailing edge (204) of each of the plurality of crop ramp segments;
   wherein the plurality of protrusions are disposed to engage the at least one elongate recess and sweep the crop particles along the at least one elongate recess and toward the trailing edge.

2. The side conveyor of claim 1, wherein each of the plurality of protrusions includes atleast one forward facing surface extending generally perpendicular to the direction of travel of the web with respect to the draper header.

3. The endless belt of claim 1, wherein each of the plurality of protrusions includes at least one forward facing surface that is disposed at an angle to sweep cut crop material toward a trailing edge of the crop ramp.

4. The endless belt of claim 1, wherein each of the plurality of protrusions includes at least one forward facing surface that is disposed at an angle to sweep cut crop material toward a leading edge of the web.

5. The side conveyor of claim 1, wherein the web further comprises a plurality of cleats that are fixed to and extend upward from the web and in a direction perpendicular to the direction of travel of the endless belt, and further wherein each of the plurality of protrusions is disposed immediately adjacent to a corresponding cleat.

6. The side conveyor of claim 5, wherein each of the plurality of protrusions abuts a corresponding cleat.

7. The side conveyor of claim 1, wherein the plurality of crop ramp segments comprises a first crop ramp segment having a first rear portion and a second crop segment, adjacent the first crop ramp segment having a second rear portion and wherein the first rear portion and the second rear portion are coplanar.

8. The side conveyor of claim 1, wherein each of the plurality of protrusions has an upper surface opposite to and facing the lower face of the crop ramp, the upper surface being parallel to the lower face of the crop ramp.

9. The side conveyor of claim 1 further comprising cleats spaced along the crop conveying surface in the direction of travel of the web, each of the cleats having a first height, wherein each of the protrusions has a second height less than the first height.

10. The side conveyor of claim 1, wherein the rear portion has a lower face opposite to and facing the web, the lower face extending in a first horizontal plane, wherein the crop conveying surface extends in a second horizontal plane and wherein each of the plurality of protrusions has an upper surface opposite to and facing the lower face of the crop ramp, the upper surface extending in a third horizontal plane, parallel to the first horizontal plane and the second horizontal plane.

11. A side conveyor for a draper header comprising:
   an endless belt, the endless belt having a direction of travel, the endless belt further comprising:
   a web comprising a crop carrying portion having an exposed upper surface and further comprising a forward edge portion, wherein the forward edge portion further comprises a plurality of protrusions fixed to and extending upward from the forward edge portion; and
   a crop ramp comprising a rear portion, wherein the rear portion has a trailing edge, wherein the rear portion is disposed to cover the forward edge portion, wherein the rear portion defines at least one elongate recess on an undersurface of the rear portion and wherein the at least one elongate recess is disposed at an angle to convey crop particles trapped between the forward edge portion of the web and the undersurface toward a trailing edge of each of the plurality of crop ramp segments, the at least one elongate recess having an internal side face oblique to the direction of travel of the endless belt;
   wherein the plurality of protrusions are disposed to engage the at least one elongate recess and sweep the crop particles along the at least one elongate recess and toward the trailing edge.

12. The side conveyor of claim 11, wherein each of the plurality of protrusions has a forward facing surface that is disposed to engage the at least one elongate recess over substantially an entire length of the at least one elongate recess.

13. The side conveyor of claim 11, wherein each of the plurality of protrusions includes at least one forward facing surface extending generally perpendicular to the direction of travel of the web.

14. The side conveyor of claim 11, wherein each of the plurality of protrusions includes at least one forward facing surface that is disposed at an angle to sweep cut crop material toward a trailing edge of the crop ramp.

15. The side conveyor of claim 11, wherein each of the plurality of protrusions includes at least one forward facing surface that is disposed at an angle to sweep cut crop material toward a leading edge of the web.

16. The side conveyor of claim 11, wherein the web further comprises a plurality of cleats that are fixed to and extend upward from the web and in a direction perpendicular to the direction of travel of the endless belt, and further wherein each of the plurality of protrusions is disposed immediately adjacent to a corresponding cleat.

17. The side conveyor of claim 11, wherein each of the plurality of protrusions abuts a corresponding cleat.

18. A draper header comprising:
   a web having a width extending in a direction transverse to a direction of travel and terminating along a forward edge portion, the web having an upper-crop conveying surface;

cleats projecting from the upper crop conveying surface and spaced apart in the direction of travel, each of the cleats having a first height;

a knife to be reciprocated, the knife being forward the web and extending parallel to the direction of travel;

a crop ramp comprising a lower front portion adjacent the knife and an upper rear portion extending over and covering the forward edge portion of the web, the rear portion having a lower face opposite to and facing the web;

protrusions projecting from the web, the protrusions being spaced apart in the direction of travel of the web, each of the protrusions having a sweeping surface facing in the direction of travel of the web and an upper surface opposite to and facing the lower face of the crop ramp, the upper surface being parallel to the lower face of the crop ramp and having a second height less than the first height of the cleats; and at least one elongate recess extending into the lower face of the rear portion, the at least one elongate recess having an internal side face oblique to the direction of travel of the web.

19. The draper header of claim 18, wherein the crop ramp comprises a plurality of crop ramp segments arranged end-to-end in a direction parallel to the direction of travel of the web.

* * * * *